(12) United States Patent
Wu et al.

(10) Patent No.: US 9,899,934 B2
(45) Date of Patent: Feb. 20, 2018

(54) RECTIFIER AND LIMITER CIRCUIT HAVING A PLURALITY OF TIME CONSTANTS AND PASSIVE RADIO FREQUENCY TAG

(71) Applicants: Excelio Technology (Shenzhen) Co., Ltd., Shenzhen (CN); Wuxi Excelio Technology CO., Ltd., Wuxi (CN)

(72) Inventors: Patrick Bian Wu, Shenzhen (CN); Fuqiang Han, Shenzhen (CN)

(*) Notice: Subject to any disclaimer, the term of this patent is extended or adjusted under 35 U.S.C. 154(b) by 0 days.

(21) Appl. No.: 15/201,621

(22) Filed: Jul. 5, 2016

(65) Prior Publication Data
US 2016/0315554 A1    Oct. 27, 2016

Related U.S. Application Data

(63) Continuation of application No. PCT/CN2015/070145, filed on Jan. 6, 2015.

(30) Foreign Application Priority Data

Jan. 8, 2014 (CN) .......................... 2014 1 0009326

(51) Int. Cl.
| | |
|---|---|
| *H02M 7/04* | (2006.01) |
| *H02M 1/32* | (2007.01) |
| *G06K 7/10* | (2006.01) |
| *H04B 5/00* | (2006.01) |
| *H04B 1/59* | (2006.01) |
| *G08B 23/00* | (2006.01) |
| *G06K 19/07* | (2006.01) |

(Continued)

(52) U.S. Cl.
CPC .......... *H02M 7/04* (2013.01); *G06K 7/10009* (2013.01); *G06K 19/0715* (2013.01); *G06K 19/0723* (2013.01); *H02J 17/00* (2013.01); *H02M 1/32* (2013.01); *H02M 7/062* (2013.01)

(58) Field of Classification Search
CPC . H02M 7/04; H02M 1/32; G06K 7/10; H04B 5/00; H04B 1/59; G08B 23/00
USPC ........ 340/10.1–10.5, 572.1, 572.4; 455/41.1, 455/572, 343.5; 342/51, 44
See application file for complete search history.

(56) References Cited

U.S. PATENT DOCUMENTS

| | | | | |
|---|---|---|---|---|
| 4,818,855 A | * | 4/1989 | Mongeon | ............. G06K 7/0008 235/440 |
| 5,889,489 A | * | 3/1999 | Friedman | ........... G06K 19/0723 342/51 |

(Continued)

*Primary Examiner* — Nam V Nguyen
(74) *Attorney, Agent, or Firm* — Wayne & Ken, LLC; Tony Hom

(57) ABSTRACT

The present invention relates to the technical field of radio frequency identification, in particular to a rectifier and limiter circuit having a plurality of time constants and a passive radio frequency tag containing this rectifier and limiter circuit. By applying analog control signals with different time constants to control terminals of two discharge paths of the rectifier and limiter circuit, respectively, i.e., adjusting the voltage amplitude at different switching speeds, switching the two discharge paths from a completely open state to a completely closed state is realized. Discharging is performed properly according to the amount of charge at antenna terminals and the level of energy of the tag, thus to improve the demodulation capacity of the tag and increase the read-write distance of the tag.

12 Claims, 12 Drawing Sheets

(51) Int. Cl.
*H02M 7/06* (2006.01)
*H02J 17/00* (2006.01)

(56) References Cited

U.S. PATENT DOCUMENTS

| | | | | |
|---|---|---|---|---|
| 6,134,130 A * | 10/2000 | Connell | ............. | G06K 19/0701 363/70 |
| 6,356,198 B1 * | 3/2002 | Wuidart | ........... | G06K 19/07777 235/384 |
| 6,667,914 B2 * | 12/2003 | Gomez | ............. | G06K 19/0723 365/185.27 |
| 6,778,070 B1 * | 8/2004 | Thomas | ............. | G06K 19/0723 340/10.1 |
| 6,859,640 B2 * | 2/2005 | Bardouillet | ........... | G01S 13/758 340/10.34 |
| 6,923,572 B2 * | 8/2005 | Kano | .................... | G01D 9/005 365/191 |
| 7,880,588 B2 * | 2/2011 | Enguent | ............. | G06K 19/0723 235/384 |
| 8,588,682 B2 * | 11/2013 | Wilson | ..................... | G05F 1/46 323/267 |
| 8,754,753 B2 * | 6/2014 | Enguent | ............. | G06K 19/0723 340/10.1 |
| 9,367,784 B2 * | 6/2016 | Tramoni | ............ | G06K 19/0701 |
| 2016/0300086 A1 * | 10/2016 | Lamothe | ................. | G05F 3/262 |
| 2016/0314389 A1 * | 10/2016 | Han | .................. | G06K 19/0709 |
| 2016/0314390 A1 * | 10/2016 | Wu | .................... | G06K 19/0709 |

\* cited by examiner

RECTIFIER AND LIMITER CIRCUIT HAVING A PLURALITY OF TIME CONSTANTS AND PASSIVE RADIO FREQUENCY TAG

CROSS-REFERENCE TO RELATED APPLICATIONS

This application is a continuation of International Patent Application No. PCT/CN2015/070145 with a filing date of Jan. 6, 2015, designating the United States, now pending, and further claims priority to Chinese Patent Application No. 201410009326.0 with a filing date of Jan. 8, 2014. The content of the aforementioned applications, including any intervening amendments thereto, are incorporated herein by reference.

TECHNICAL FIELD

The present invention belongs to the technical field of radio frequency identification, and particularly relates to a rectifier and limiter circuit having a plurality of time constants and a passive radio frequency tag containing this rectifier and limiter circuit.

BACKGROUND OF THE PRESENT INVENTION

Passive radio frequency identification (RFID) tags, as they themselves are not designed with any battery, operate relying on electromagnetic energy sent from a card reader. Due to their simple structure and economical practicality, passive RFID tags have been widely applied in the fields of logistics management, asset tracking and mobile healthcare.

When a passive RFID tag operates, it will absorb electromagnetic energy, sent from a card reader, from the surrounding. After absorbing the energy, the passive RFID tag rectifies part of the energy into DC power for powering internal circuits of the passive RFID tag; and the passive RFID tag further inputs the other part of the energy to an internal modulation/demodulation circuit which will demodulate an amplitude modulation signal carried in this energy and send the demodulated signal to a digital baseband portion of the passive RFID tag for processing.

As the distance between the passive RFID tag and the card reader varies, the electromagnetic energy absorbed by the passive RFID tag during operating from the surrounding varies too. When the passive RFID tag is too close to the card reader or the electromagnetic energy sent from the card reader is too high, the strength of a signal received by the passive RFID tag will also be high, so that the voltage sensed on the coil exceeds the voltage-withstanding limit of a transistor for the rectifier module in the chip. As a result, the transistor is damaged permanently, and the RFID tag no longer functions.

The passive RFID tag transmits data to the card reader in a load modulation manner, and the coil at the card reader side acquires the data upon detecting change in the impedance of the coil at the RFID tag side. When the passive RFID tag is too close to the card reader or the electromagnetic energy sent from the card reader is too high, a load modulation signal coupled from the RFID tag side is likely to result in saturation of the receiving end of the card reader, thus to fail the communication. Such failure is more likely to occur in an RTF (Reader Talk First) communication mode where the card reader sends a command first and then waits for a response from the RFID tag.

Meanwhile, in the RTF (Reader Talk First) communication mode, the card reader sends energy to the tag first, which is called downlink communication; and the tag, after coupling this energy and reading a demodulation signal in the energy, executes the demodulation of the command and sends results of processing back to the card reader, which is called uplink communication. In the event of half-duplex communication, during the uplink communication, since the card reader has stopped sending energy to the tag, the demodulation of the command and the uplink communication by the tag both rely on the limited energy sent from the card reader during its downlink communication. If the energy is too low, the tag can not demodulate the command well and execute the uplink communication, that is, the card reader can not read data in the tag. Therefore, it is necessary to place the card reader closer to the tag in order to send more energy to the tag in the downlink communication stage, so that the tag can complete the whole command demodulation and the uplink communication. In short, when the energy in the tag is too low, the read-write distance of the tag will be significantly influenced, and hence, it is required to perform effective control management to the power supply terminal of the tag. When the energy of the tag is too high, it is required to open the discharge path to discharge the surplus charge. When the voltage of the tag side is too low, it is required to close all discharge paths to realize the most effective use of power.

In order to solve the aforementioned problems of voltage-withstanding reliability, saturation of reception at the card reader, and energy retention during the uplink communication of the tag, it is required to provide an amplitude limitation processing circuit in the interior of an RFID tag chip circuit, in order to ensure that the voltage across both ends of an antenna on the RFID tag is limited to a predetermined value.

SUMMARY OF PRESENT INVENTION

A technical problem to be solved by embodiments of the present invention is to provide a rectifier and limiter circuit having a plurality of time constants and a passive radio frequency tag, where controlling the circuit voltage is realized by adjusting the discharge paths of the passive radio frequency tag, the saturation of reception at the card reader side is avoided, and the read-write distance of the tag is effectively increased.

In order to achieve the above objective, the present invention employs the following technical solutions.

A rectifier and limiter circuit having a plurality of time constants is provided, including:

a resonant capacitor, which is connected, between a first antenna terminal and a second antenna terminal, in parallel to a resonant inductor, and configured to form a resonant circuit together with the resonant inductor, receive an external electromagnetic field and couple the external electromagnetic field to a rectifier circuit;

a rectifier circuit, the input terminal of which is connected to the first antenna terminal and the second antenna terminal and configured to convert AC power, to which the resonant circuit is coupled, into DC power and output the DC power to an external load circuit, and meanwhile, one output terminal of which is grounded by two discharge paths connected in parallel and configured to output charge to the ground when the field intensity is too high; and the input terminals of the two discharge paths are respectively connected to the output terminals of the rectifier circuit, the control terminals of the two discharge paths are respectively controlled by a first control circuit and a second control circuit having different time constants, and the output terminals of the two discharge paths are connected to each other and grounded.

Further, the first control circuit includes a second current mirror transistor, a first resistor, a second resistor, a fifth N-type MOS transistor, a sixth N-type MOS transistor and a first P-type MOS transistor;

the source of the second current mirror transistor is connected to a power supply terminal, the drain thereof is grounded by the first resistor and the second resistor connected in series, and the gate thereof is connected to a bias voltage terminal; the source of the fifth N-type MOS transistor is connected to the drain terminal of the second current mirror transistor, the drain thereof is connected to the output terminal of the first control circuit, and the gate thereof is connected to a control signal terminal; the source of the first P-type MOS transistor is connected to the drain terminal of the second current mirror transistor, the drain thereof is connected to the output terminal of the first control circuit, and the gate thereof is connected to the gate of the sixth N-type MOS transistor, and the drain of the sixth N-type MOS transistor is connected to the output terminal of the first control circuit, the source thereof is grounded, and the gate of the first P-type MOS transistor and the gate of the sixth N-type MOS transistor are connected to a control signal terminal opposite to the control signal of the gate terminal of the fifth N-type MOS transistor.

Still further, the second control circuit includes a third current mirror transistor, a third resistor, a fourth resistor, a logic series switch unit, a first capacitor, a second capacitor and a seventh N-type MOS transistor;

the source of the third current mirror transistor is connected to the power supply terminal, the drain thereof is grounded by the third resistor and the fourth resistor connected in series, and the gate thereof is connected to the bias voltage terminal; the input terminal of the logic series switch unit is connected to the drain terminal of the third current mirror transistor, and the output terminal thereof is connected to the output terminal of the second control circuit; the first capacitor is connected to the second capacitor in parallel, the positive poles of the first capacitor and the second capacitor are connected to each other and to the output terminal of the logic series switch unit, and the negative poles thereof are connected to each other and grounded; and the source terminal of the seventh N-type MOS transistor is grounded, the gate thereof is connected to the control signal terminal, and the drain thereof is connected to the output terminal of the second control circuit.

Another objective of the embodiments of the present invention is to provide a passive radio frequency tag including this rectifier and limiter circuit having a plurality of time constants.

In the rectifier and limiter circuit having a plurality of time constants of the present invention, two discharge paths are connected in parallel to the output terminal of the rectifier circuit, the control terminals of the two discharge paths are controlled by analog signals having different time constants, i.e., the amplitudes of voltages of the two paths are controlled by analog signals having different increase or decrease speeds. The first analog control signal is a set of logic switches connected in parallel, which have small time constants and can quickly switch between the state with output signals and the state without any output signal, so that the first discharge path controlled by the first analog control signal can be quickly switched between an open state and a closed state, thereby realizing quick control. The second analog control signal is a loop constituted of the logic series switch unit and the capacitors, which has great time constants and can slowly switch between the state with output signals and the state without any output signal, so that the second discharge path controlled by the second analog control signal can be slowly switched between an open state and a closed state, thereby realizing slow control. In the present invention, by applying analog control signals with different time constants (i.e., adjusting the voltage amplitude at different switching speeds) to the control terminals of the two discharge paths, respectively, switching the two discharge paths from a completely open state to a completely closed state is realized. Discharging is performed properly according to the amount of charge at antenna terminals and the level of energy of the tag, thus to improve the demodulation capacity of the tag and increase the read-write distance of the tag.

DESCRIPTION OF THE DRAWINGS

In order to explain technical solutions in embodiments of the present invention or in the prior art more clearly, the accompanying drawings to be used for describing the embodiments will be introduced simply. Apparently, the accompanying drawings to be described below merely show some embodiments of the present invention, and those skilled in the art may further obtain other drawings according to these drawings without any creative effort.

DETAILED DESCRIPTION OF PREFERRED EMBODIMENTS

Technical solutions in embodiments of the present invention will be described clearly and completely with reference to the accompanying drawings in the embodiments of the present invention. Apparently, the embodiments to be described are merely some embodiments of the present invention rather than all embodiments of the present invention. Based on the embodiments of the present invention, all other embodiments obtained by those skilled in the art without any creative effort shall fall into the protection scope of the present invention.

Figure 1:
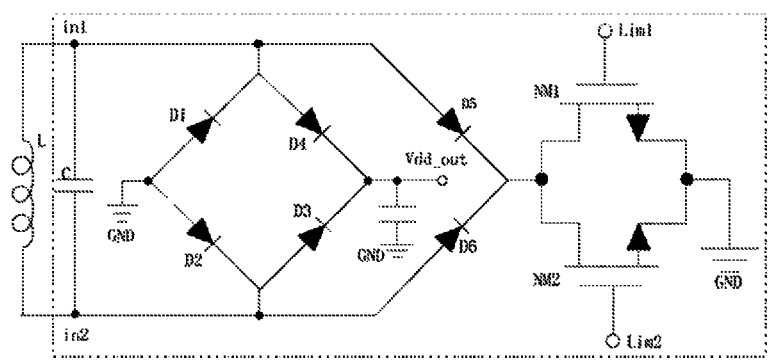
FIG. 1 is a general structure diagram of Embodiment 1 of a circuit according to the present invention.

FIG. 1 is a general structure diagram of Embodiment 1 of a circuit according to the present invention. A rectifier and limiter circuit having a plurality of time constants described in the present invention includes:

a resonant capacitor C, which is connected, between a first antenna terminal in1 and a second antenna terminal in2, in parallel to a resonant inductor L, and configured to form a resonant circuit together with the resonant inductor L, receive an external electromagnetic field and couple the external electromagnetic field to a rectifier circuit;

a rectifier circuit, the input terminal of which is connected to the first antenna terminal in1 and the second antenna terminal in2 and configured to convert AC power, to which the resonant circuit is coupled, into DC power and output the DC power to an external load circuit, and meanwhile, one output terminal of which is grounded by two discharge paths connected in parallel and configured to output charge to the ground when the field intensity is too high; and the input terminals of the two discharge paths are respectively connected to the output terminals of the rectifier circuit, the control terminals of the two discharge paths are respectively controlled by a first control circuit and a second control circuit having different time constants, and the output terminals of the two discharge paths are connected to each other and grounded.

In the present invention, by applying analog control signals with different time constants (i.e., adjusting the voltage amplitude at different switching speeds) to the control terminals of the two discharge paths, respectively, switching the two discharge paths from a completely open state to a completely closed state is realized. Discharging is performed properly according to the amount of charge at antenna terminals and the level of energy of the tag, thus to improve the demodulation capacity of the tag and increase the read-write distance of the tag.

As shown in FIG. 1, the rectifier circuit includes a first rectifier branch and a second rectifier branch connected in parallel between the first antenna terminal in1 and the second antenna terminal in2.

The first rectifier branch is a bridge rectifier circuit, one output terminal of which is grounded, and the other output terminal $V_{dd\_out}$ of which is connected to the external load circuit and configured to convert AC power, to which the resonant circuit is coupled, into DC power to power the external load circuit.

The second rectifier branch is a fifth diode D5 and a sixth diode D6 connected between the first antenna terminal in1 and the second antenna terminal in2. The cathode terminals of the fifth diode D5 and the sixth diode D6 are connected to each other and to the input terminal of the two discharge paths.

Figure 2:
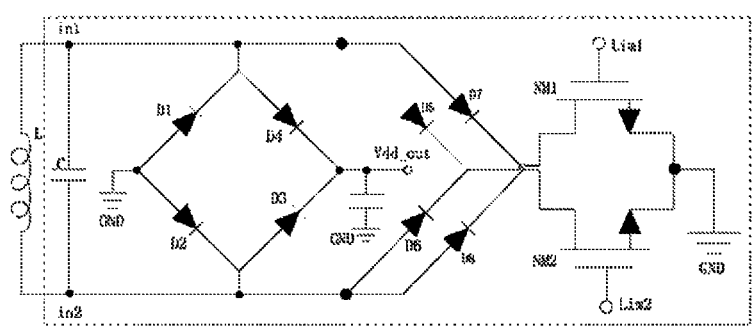
FIG. 2 is a structure diagram of Embodiment 2 of the overall structure of the circuit according to the present invention.

The structure of a second embodiment of the second rectifier branch is as shown in FIG. 2. In this embodiment, the second rectifier branch is a fifth diode D5 and a sixth diode D6 connected between the first antenna terminal in1 and the second antenna terminal in2, as well as a seventh diode D7 and an eighth diode D8. The cathode terminals of the fifth diode D5 and the sixth diode D6 are connected to each other and to the input terminal of the first discharge path, and the cathode terminals of the seventh diode D7 and the eighth diode D8 are connected to each other and to the input terminal of the second discharge path.

With respect to the structure of the first embodiment as shown in FIG. 1, the structure of the second embodiment of the second rectifier branch as shown in FIG. 2 improves the flexibility of further controlling the amplitude limitation and current discharge. Corresponding to the leakage discharge circuits controlled by the control signals having different time constants, the size of rectifier devices D5, D6, D7 and D8 may be further optimized and adjusted, so that leakage current actually entering the discharge paths is different in value at different amplitude limiting points, thus to achieve optimization of the system. Meanwhile, by further considering the size of the devices D5, D6, D7 and D8, requirements of electrostatic breakdown voltage indicators that chip pins exposed to the exterior may withstand may be met without influencing the performance of the entire system, equivalently to addition of a design parameter which is controlled relative dependently. A more optimized reliability design may be achieved easily.

Figure 3:
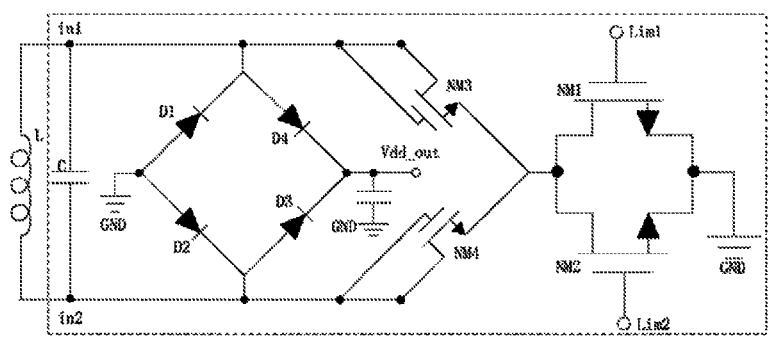
FIG. 3 is a structure diagram of Embodiment 3 of the overall structure of the circuit according to the present invention.

The structure of a third embodiment of the second rectifier branch is as shown in FIG. 3. The second rectifier branch is a third N-type MOS transistor NM3 and a fourth N-type MOS transistor NM4 connected between the first antenna terminal in1 and the second antenna terminal in2. The gate and drain of the third N-type MOS transistor NM3 are respectively connected to the first antenna terminal, the gate and drain of the fourth N-type MOS transistor NM4 are respectively connected to the second antenna terminal, and the source of the third N-type MOS transistor NM3 are connected to the source of the fourth N-type MOS transistor NM4 and to the input terminals of the two discharge paths.

Figure 4:
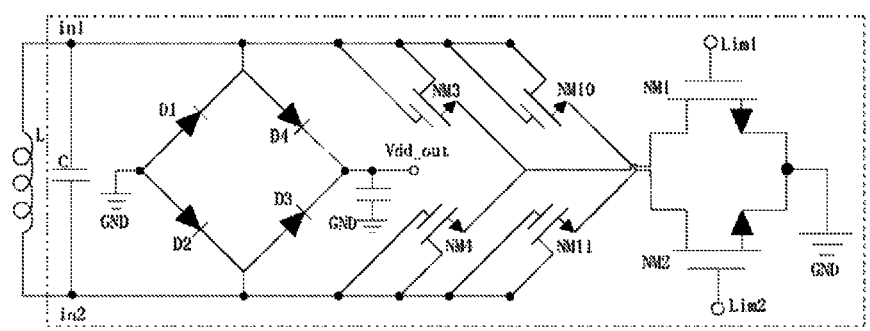
FIG. 4 is a structure diagram of Embodiment 4 of the overall structure of the circuit according to the present invention.

The structure of a fourth embodiment of the second rectifier branch is as shown in FIG. 4. The second rectifier branch is a third N-type MOS transistor NM3 and a fourth N-type MOS transistor NM4 connected between the first antenna terminal in1 and the second antenna terminal in2, as well as a tenth N-type MOS transistor NM10 and an eleventh N-type MOS transistor NM11. The gate and drain of the third N-type MOS transistor NM3 are respectively connected to the first antenna terminal, the gate and drain of the fourth N-type MOS transistor NM4 are respectively connected to the second antenna terminal, and the source of the third N-type MOS transistor NM3 is connected to the source of the fourth N-type MOS transistor NM4 and to the input terminal of the first discharge path. The gate and drain of the tenth N-type MOS transistor NM10 are respectively connected to the first antenna terminal, the gate and drain of the eleventh N-type MOS transistor NM11 are respectively connected to the second antenna terminal, and the source of the tenth N-type MOS transistor NM10 is connected to the source of the eleventh N-type MOS transistor NM11 and connected to the input terminal of the second discharge path.

With respect to the structure of the third embodiment as shown in FIG. 3, the structure of the fourth embodiment of the second rectifier branch as shown in FIG. 4 improves the flexibility of further controlling the amplitude limitation and current discharge. Corresponding to the leakage discharge circuits controlled by the control signals having different time constants, the size of rectifier devices NM3, NM4, NM10 and NM11 may be further optimized and adjusted, so that leakage current actually entering the discharge paths is different in value at different amplitude limiting points, to achieve optimization of the system. Meanwhile, by further considering the size of the devices NM3, NM4, NM10 and NM11, requirements of electrostatic breakdown voltage indicators that chip pins exposed to the exterior may withstand may be met without influencing the performance of the entire system, equivalently to addition of a design parameter which is controlled relative dependently. A more optimized reliability design may be achieved easily.

The two discharge paths are a first N-type MOS transistor NM1 and a second N-type MOS transistor NM2 connected in parallel. The drains of the first N-type MOS transistor NM1 and the second N-type MOS transistor NM2 are connected to the output terminal of the rectifier circuit. As described above, the drains of the first N-type MOS transistor NM1 and the second N-type MOS transistor NM2 may be connected to each other and then to the output terminal of the rectifier circuit simultaneously, or may be respectively connected to the output terminal of the rectifier circuit in two paths. The gate of the first N-type MOS transistor NM1 is connected to the output terminal of the first control circuit Lim1, and the source thereof is grounded to form a first discharge path. The gate of the second N-type MOS transistor NM2 is connected to the output terminal of the second control circuit Lim2, and the source thereof is grounded to form a second discharge path.

Figure 5:
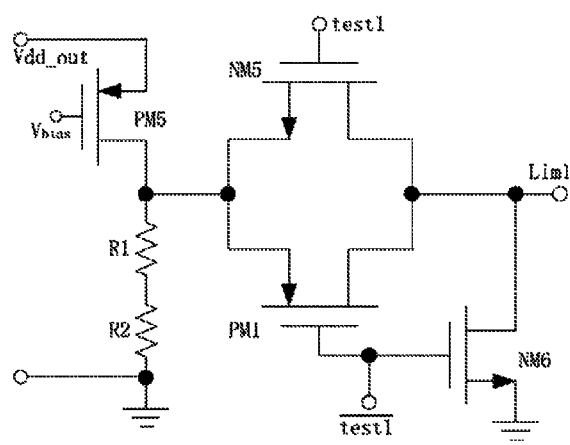
FIG. 5 is a structure diagram of a first control circuit according to the present invention.

FIG. 5 is a structure diagram of a first control circuit according to the present invention. The first control circuit includes a second current mirror transistor PM5, a first resistor R1, a second resistor R2, a fifth N-type MOS transistor NM5, a sixth N-type MOS transistor NM6 and a first P-type MOS transistor PM1.

The source of the second current mirror transistor PM5 is connected to the power supply terminal $V_{dd\_out}$, the drain thereof is grounded by the first resistor R1 and the second resistor R2 connected in series, and the gate thereof is connected to a bias voltage terminal $V_{bias}$.

The source of the fifth N-type MOS transistor NM5 is connected to the drain terminal of the second current mirror transistor PM5, the drain thereof is connected to the output terminal Lim1 of the first control circuit, and the gate thereof is connected to the control signal terminal; the source of the first P-type MOS transistor PM1 is connected to the drain terminal of the second current mirror transistor PM5, the drain thereof is connected to the output terminal Lim1 of the first control circuit, and the gate thereof is connected to the gate of the sixth N-type MOS transistor NM6; the drain of the sixth N-type MOS transistor NM6 is connected to the output terminal Lim1 of the first control circuit, and the source thereof is grounded; and the gate of the first P-type MOS transistor PM1 and the gate of the sixth N-type MOS transistor NM6 are connected to a control signal terminal opposite to the control signal of the gate terminal of the fifth N-type MOS transistor NM5. In this embodiment, the gate of the fifth N-type MOS transistor NM5 is connected to a test signal test1, and the gates of the first P-type MOS transistor PM1 and the sixth N-type MOS transistor NM6 are connected to a test signal $\overline{test1}$ opposite to test1. When the test signal test1 of the gate terminal of the fifth N-type MOS transistor NM5 is 1, the fifth N-type MOS transistor NM5 is turned on. When the $\overline{test1}$ is 0, the first P-type MOS transistor PM1 is also turned on, the sixth N-type MOS transistor NM6 is not turned on, and the output terminal Lim1 of the first control circuit outputs a signal to the control terminal of the first discharge path, i.e., the gate of the first N-type MOS transistor NM1, to open the first discharge path and to discharge charge between the first antenna terminal in1 and the second antenna terminal in2 to the ground. When test1 of the gate terminal of the fifth N-type MOS transistor NM5 is 0, the fifth N-type MOS transistor NM5 is not turned on. When the $\overline{test1}$ is 1, the first P-type MOS transistor PM1 is also not turned on, while the sixth N-type MOS transistor NM6 is turned on. Charge of the output terminal Lim1 of the first control circuit is pulled down to the ground so that Lim1 has no any output signal. Hence, the first N-type MOS transistor NM1 is in an OFF state, and the first discharge path is closed without discharging so that charge between the first antenna terminal in1 and the second antenna terminal in2 is maintained.

The first resistor R1 and the second resistor R2 are connected in series between the drain of the second current mirror transistor PM5 and the ground. According to the Ohm's law, the voltage, generated by the current output by the second current mirror transistor PM5 after connecting the first resistor R1 and the second resistor R2 in series, is transmitted to a junction of the Lim1 by a logic switch constituted of the PM1 and the NM5. Therefore, by setting the resistance of both the first resistor R1 and the second resistor R2, the voltage amplitude of the output terminal Lim1 of the first control circuit may be adjusted. The larger the Lim1 is, the larger the open channel of the first N-type MOS transistor NM1 controlled by the Lim1 is, and the higher the discharge speed is.

Figure 6:
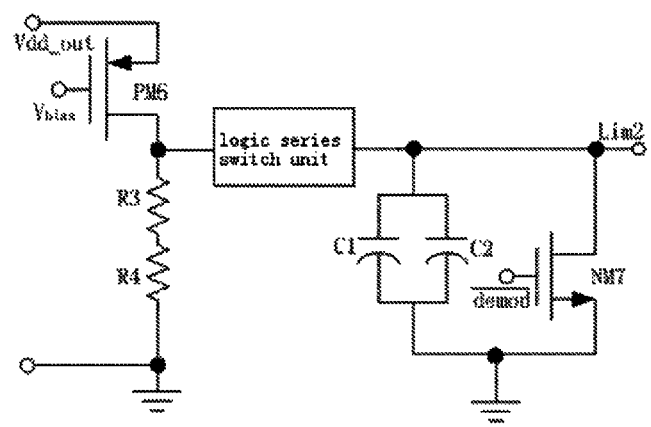
FIG. 6 is a structure block diagram of a second control circuit according to the present invention.

FIG. 6 is a structure diagram of a second control circuit according to the present invention. The second control circuit includes a third current mirror transistor PM6, a third resistor R3, a fourth resistor R4, a logic series switch unit, a first capacitor C1, a second capacitor C2 and a seventh N-type MOS transistor NM7.

The source of the third current mirror transistor PM6 is connected to the power supply terminal $V_{dd\_out}$, the drain thereof is grounded by the third resistor R3 and the fourth resistor R4 connected in series, and the gate thereof is connected to the bias voltage terminal $V_{bias}$. The input terminal of the logic series switch unit is connected to the drain terminal of the third current mirror transistor PM6, and the output terminal thereof is connected to the output terminal Lim2 of the second control circuit; the first capacitor C1 is connected in parallel to the second capacitor C2, the positive poles of the first capacitor C1 and the second capacitor C2 are connected to each other and to the output terminal of the logic series switch unit, and the negative poles of the first capacitor C1 and the second capacitor C2 are connected to each other and grounded; and the source terminal of the seventh N-type MOS transistor NM7 is grounded, the gate thereof is connected to the control signal terminal, and the drain thereof is connected to the output terminal Lim2 of the second control circuit.

The third resistor R3 and the fourth resistor R4 are connected in series between the drain of the third current mirror transistor PM6 and the ground. According to the Ohm's law, the voltage, generated by the current output by the third current mirror transistor PM6 after connecting the third resistor R3 and the fourth resistor R4 in series, is transmitted to a junction of the Lim2 by the logic switch unit. Therefore, by setting the resistance of both the third resistor R3 and the fourth resistor R4, the voltage amplitude of the output terminal Lim2 of the second control circuit may be adjusted. The larger the Lim2 is, the larger the open channel of the second N-type MOS transistor NM2 controlled by the Lim2 is, and the higher the discharge speed is.

The logic series switch unit is at least one logic switch in which the source terminal of the eighth N-type MOS transistor NM8 is connected to the source terminal of the second P-type MOS transistor PM2 and to the drain terminal of the third current mirror transistor NM6 to serve as the input terminal of the logic series switch unit, the drain terminal of the eighth N-type MOS transistor NM8 is connected to the drain terminal of the second P-type MOS transistor PM2 to serve as the output terminal of the logic series switch unit, the gate terminal of the eighth N-type MOS transistor NM8 is connected to the control signal terminal, and the gate terminal of the second P-type MOS transistor PM2 is connected to the control signal terminal opposite to the control signal of the gate terminal of the eighth N-type MOS transistor NM8. In this embodiment, the gate of the eighth N-type MOS transistor NM8 is connected to a demodulation signal demod, the gate of the second P-type MOS transistor PM2 is connected to a demodulation signal $\overline{demod}$ opposite to the demod, as shown in FIG. 7.

Figure 8:
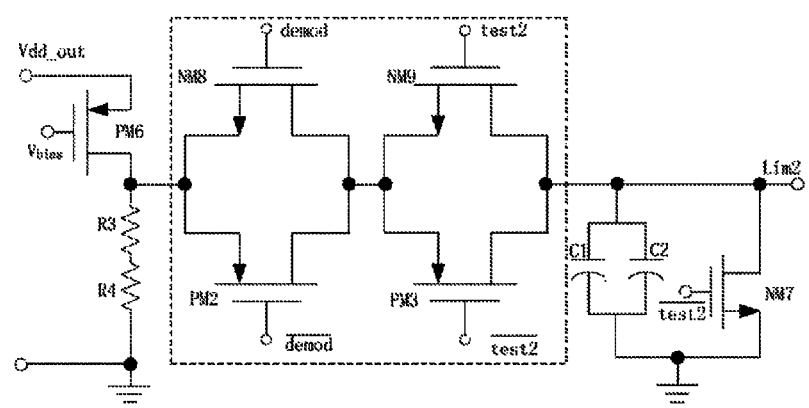
FIG. 8 is a structure diagram of Embodiment 2 of the second control circuit according to the present invention.

As the structure of another embodiment of the logic series switch unit of the present invention, the logic series switch unit is two logic switches, as shown in FIG. 8. The structure of the first logic switch is as described above. The drain terminal of the eighth N-type MOS transistor NM8 is connected to the drain terminal of the second P-type MOS transistor PM2 to serve as the output terminal of the first logic switch. In the second logic switch, the source terminal of the ninth N-type MOS transistor NM9 is connected to the source terminal of the third P-type MOS transistor PM3 and to the output terminal of the first logic switch to serve as the input terminal of the second logic switch, the drain terminal of the ninth N-type MOS transistor NM9 is connected to the drain terminal of the third P-type MOS transistor PM3 to serve as the output terminal of logic switch unit; and the gate terminal of the ninth N-type MOS transistor NM9 is connected to the control signal terminal, and the gate terminal of the third P-type MOS transistor PM3 is connected to a control signal terminal opposite to the control signal of the gate terminal of the ninth N-type MOS transistor NM9. In this embodiment, the gate of the ninth N-type MOS transistor NM9 is connected to a test signal test2, and the gate of the third P-type MOS transistor PM3 is connected to a test signal $\overline{test2}$ opposite to the test2, as shown in FIG. 8.

The first capacitor C1 is connected in parallel to the second capacitor C2, the positive poles of the first capacitor C1 and the second capacitor C2 are connected to each other and to the output terminal of the logic series switch unit, the negative poles of the first capacitor C1 and the second capacitor C2 are connected to each other and grounded; and the source terminal of the seventh N-type MOS transistor NM7 is grounded, the gate thereof is connected to the control signal terminal test2, and the drain thereof is connected to the output terminal Lim2 of the second control circuit. Due to the function of charge storage of the first capacitor C1 and the second capacitor C2, the voltage output by the output terminal of the logic series switch unit, i.e., the output terminal Lim2 of the second control circuit, becomes slow. The larger the capacitance of the first capacitor C1 and the second capacitor C2 is, the slower the change of the Lim2 is. The speed of change of the Lim 2 is subject to the capacitance of C1 and C2.

Figure 7:
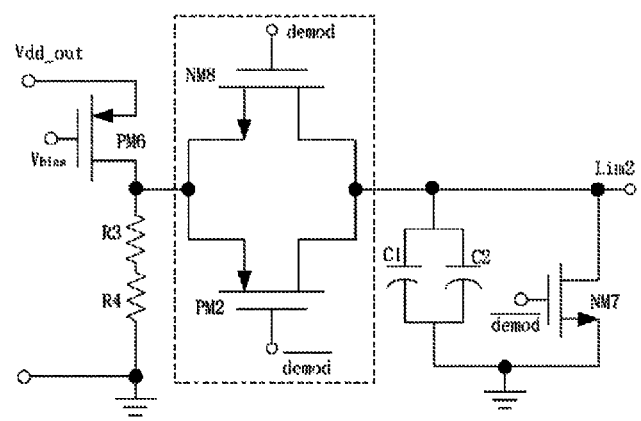
FIG. 7 is a structure diagram of Embodiment 1 of the second control circuit according to the present invention.

When the logic series switch unit is one logic switch as shown in FIG. 7, the gate terminal of the eighth N-type MOS transistor NM8 is connected to the demodulation signal demod, the gate of the second P-type MOS transistor PM2 is connected to a demodulation signal $\overline{demod}$ opposite to the demod, and meanwhile, the gate terminal of the seventh N-type MOS transistor NM7 is connected to the demodulation signal $\overline{demod}$. When the gate terminal of the eighth N-type MOS transistor NM8 is 1, the eighth N-type MOS transistor NM8 is turned on. When the $\overline{demod}$ is 0, the second P-type MOS transistor PM2 is turned on, the logic series switch unit outputs, and the output terminal Lim2 of the second control circuit outputs a signal to the control terminal of the second discharge path, i.e., the gate of the second N-type MOS transistor NM2. In this way, the second discharge path is opened to discharge charge between the first antenna terminal in1 and the second antenna terminal in2 to the ground. Meanwhile, the output from the logic series switch unit charges the first capacitor C1 and the second capacitor C2. The duration of charge determines the speed of change in the signal voltage amplitude of the Lim2. As the $\overline{demod}$ of the gate terminal of the seventh N-type MOS transistor NM7 is 0, the seventh N-type MOS transistor NM7 is not turned on. When the demod signal of the gate terminal of the eighth N-type MOS transistor NM8 is 0, the eighth N-type MOS transistor NM8 is not turned on. When the $\overline{demod}$ is 1, the second P-type MOS transistor PM2 is not turned on, while the seventh N-type MOS transistor NM7 is turned on. Charge of the second control circuit is pulled down to the ground so that the Lim2 has no any output signal, and the second N-type MOS transistor NM2 is in an OFF state, the second discharge path is closed without discharging so that charge between the first antenna terminal in1 and the second antenna terminal in2 is maintained.

When the logic series switch unit is two logic switches as shown in FIG. 8, as the first logic switch and the second logic switch are of a serial connection structure, the output terminal Lim2 of the second control circuit outputs a signal only when the first logic switch and the second logic switch are turned on simultaneously. That is, the Lim2 outputs a signal when both the demod signal and the test2 signal are 1. A control signal at the gate terminal of the seventh N-type MOS transistor NM7 may be a $\overline{demod}$ signal or a $\overline{test2}$ signal, arbitrarily. In the event of a $\overline{demod}$ signal, equivalently, at the level of the system design, the demod signal is "1" and the $\overline{demod}$ signal is "0" when the system is receiving and demodulating a downlink signal. In order to ensure the operation of a demodulator to avoid failure of demodulation when the energy is too high, the limiter circuit needs to limit the rectifier. That is, the output terminal Lim2 of the second control circuit needs to output a signal to open the second discharge path to discharge the current. The control principle of the circuit, i.e., using the demod signal or the test2 signal or other signals as the control signal, relates to targets of optimizing the performance of the designed specific radio frequency system, which will not be repeated herein.

The gate terminals of the second current mirror transistor PM5 and the third current mirror transistor PM6 are both connected to the bias voltage terminal $V_{bias}$, and the size of the second current mirror transistor PM5 is proportional to that of the third current mirror transistor PM6. When there is a bias voltage input to the bias voltage terminal $V_{bias}$, the second current mirror transistor PM5 and the third current mirror transistor PM6 are turned on. In this case, the current at the power supply terminal $V_{dd\_out}$ flows through the sources and drains of the second current mirror transistor PM5 and the third current mirror transistor PM6 and into the first control circuit and the second control circuit, respectively.

Figure 9:
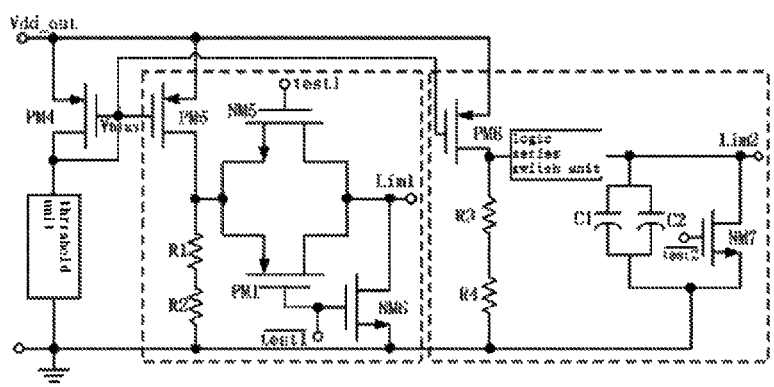
FIG. 9 is a structure diagram of connection between the first control circuit and the second circuit according to the present invention.

As a further optimized implementation structure of the present invention, in order to control operating points of the first control circuit and the second control circuit so that the first control circuit and the second control circuit are opened to operate after the voltage of the power supply terminal $V_{dd\_out}$ reaches a certain voltage amplitude, in the present invention, the gates of the second current mirror transistor PM5 and the third current mirror transistor PM6 are respectively connected to the first current mirror transistor PM4, as shown in FIG. 9. The source of the first current mirror transistor PM4 is connected to the power supply terminal $V_{dd\_out}$, and the drain thereof is grounded by the threshold unit. In such a structure, the first current mirror transistor PM4, the second current mirror transistor PM5 and the third current mirror transistor PM6 constitute an exact mirror image mapping structure. The second current mirror transistor PM5 and the third current mirror transistor PM6 are controlled to be opened or closed, by opening or closing the first current mirror transistor PM4, thus to achieve an objective of controlling the first control circuit and the second control circuit to be opened or closed. That is, when the voltage of the power supply terminal $V_{dd\_out}$ is higher than the sum of the threshold voltage of the first current mirror transistor PM4 and the threshold voltage of the threshold unit, the first current mirror transistor PM4 is turned on, the drain of the first current mirror transistor PM4 connected in short to the gate thereof outputs a voltage as the bias voltage of the current mirror, so that the second current mirror transistor PM5 and the third current mirror transistor PM6 are turned on. When the voltage of the power supply terminal $V_{dd\_out}$ is lower than the sum of the threshold voltage of the first current mirror transistor PM4 and the threshold voltage of the threshold unit, the first current mirror transistor PM4 is turned off, there is no voltage output from the drain of the first current mirror transistor PM4 connected in short to the gate thereof, so that the second current mirror transistor PM5 and the third current mirror transistor PM6 are turned off as well, and the voltage of the power supply terminal $V_{dd\_out}$ can not flow through the second current mirror transistor PM5 and the third current mirror transistor PM6 into the first control circuit and the second control circuit. As a result, neither the first control circuit nor the second control circuit will operate.

As the threshold voltage of the first current mirror transistor PM4 is fixed, the total threshold voltage of the threshold unit is determined by setting the number of one-way conductive devices in the threshold unit. The threshold unit may be at least one diode connected in series, or at least one P-type MOS transistor connected in series, or at least one N-type MOS transistor connected in series.

Figure 10:
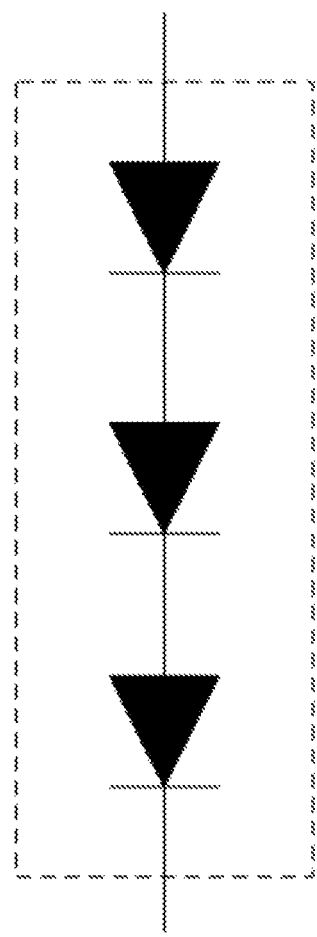
FIG. 10 is a structure diagram of Embodiment 1 of a threshold unit according to the present invention.
Figure 11:
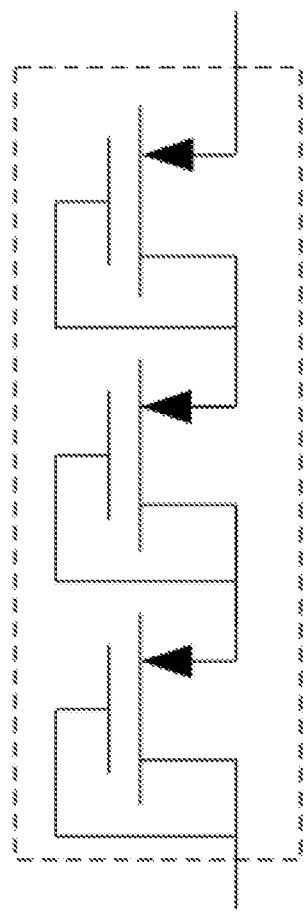
FIG. 11 is a structure diagram of Embodiment 2 of the threshold unit according to the present invention.
Figure 12:
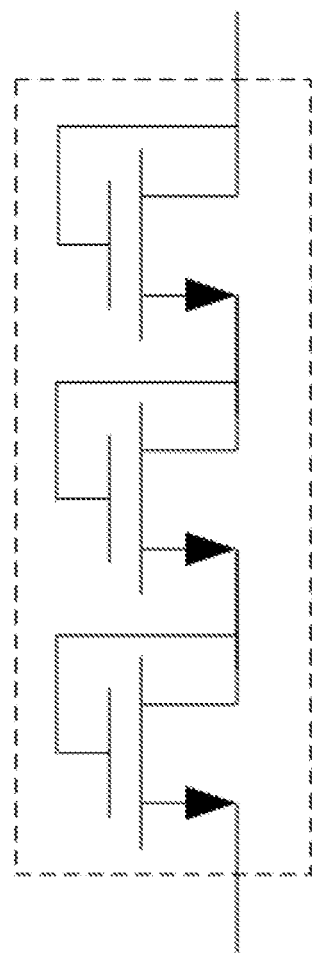
FIG. 12 is a structure diagram of Embodiment 3 of the threshold unit according to the present invention.

Among the at least one diode, the cathode terminal of any diode is connected to the anode terminal of an adjacent diode to form a serial structure, the anode terminal of a first diode is connected to the drain terminal of the first current mirror transistor PM4 to serve as the input terminal of the threshold unit, and the cathode terminal of the last diode is grounded to serve as the output terminal of the threshold unit, as shown in FIG. 10;

among the at least one P-type MOS transistor, the drain terminal of any P-type MOS transistor is connected to the source terminal of an adjacent P-type MOS transistor to form a serial structure, the source of the first P-type MOS transistor is connected to the drain terminal of the first current mirror transistor PM4 to serve as the input terminal of the threshold unit, the drain of the last P-type MOS transistor is grounded to serve as the output terminal of the threshold unit, and the gate of each P-type MOS transistor is connected to the drain thereof, as shown in FIG. 11, and among the at least one N-type MOS transistor, the source terminal of any N-type MOS transistor is connected to the drain terminal of an adjacent N-type MOS transistor to form a serial structure, the drain of the first N-type MOS transistor is connected to the drain terminal of the first current mirror transistor PM4 to serve as the input terminal of the threshold unit, the source of the last N-type MOS transistor is grounded to serve as the output terminal of the threshold unit, and the gate of each N-type MOS transistor is connected to the drain thereof, as shown in FIG. 12.

Another objective of the present invention is to provide a passive radio frequency tag including this rectifier and limiter circuit having a plurality of time constants. There are two discharge paths connected in parallel to the output terminal of the rectifier and limiter circuit of the passive radio frequency tag, and the control terminals of the two discharge paths are respectively controlled by the first control circuit and the second control circuit. The first control circuit quickly switches between a state with output signals and a state without any control signal, according to the opening or closing of one set of switch transistors, so that the first discharge path controlled by the first control circuit can be quickly switched between the open state and the closed state, thereby quickly discharging charge at the antenna terminals. Due to a set of capacitors arranged at the output terminal of the second control circuit, the second control circuit switches between the state with output signals and the state without any output signal slowly, so that the second discharge path controlled by the second control circuit can be slowly switched between the open state to the closed state, thereby slowly discharging charge at the antenna terminals. In the present invention, by applying analog control signals with different time constants (i.e., adjusting the voltage amplitude at different switching speeds) to the control terminals of the two discharge paths, respectively, switching the two discharge paths from a completely open state to a completely closed state is realized. Discharging is performed properly according to the amount of charge at antenna terminals and the level of energy of the tag, thus to improve the demodulation capacity of the tag and increase the read-write distance of the tag.

We claim:

1. A rectifier and limiter circuit having a plurality of time constants, comprising:
   a resonant capacitor, which is connected, between a first antenna terminal and a second antenna terminal, in parallel to a resonant inductor, and configured to form a resonant circuit together with the resonant inductor, receive an external electromagnetic field and couple the external electromagnetic field to a rectifier circuit;
   the rectifier circuit, the input terminal of which is connected to the first antenna terminal and the second antenna terminal and configured to convert alternating current power, to which the resonant circuit is coupled, into direct current power and output the direct current power to an external load circuit, and meanwhile, one output terminal of which is grounded by two discharge paths connected in parallel and configured to output charge to the ground when the field intensity is too high; and
   input terminals of the two discharge paths are respectively connected to at least one output terminal of the rectifier circuit; control terminals of the two discharge paths are respectively controlled by a first control circuit and a second control circuit having different time constants; and the output terminals of the two discharge paths are connected to each other and grounded;
   the rectifier circuit comprises a first rectifier branch and a second rectifier branch connected in parallel between the first antenna terminal and the second antenna terminal, the output terminal of the first rectifier branch being connected to an external load circuit and the output terminal of the second rectifier branch being grounded by two discharge paths connected in parallel.

2. The rectifier and limiter circuit having a plurality of time constants according to claim 1, characterized in that the second rectifier branch is a fifth diode and a sixth diode connected between the first antenna terminal and the second antenna terminal; a cathode terminals of the fifth diode and the sixth diode being connected to each other and to the input terminals of the two discharge paths.

3. The rectifier and limiter circuit having a plurality of time constants according to claim 1, characterized in that the second rectifier branch is a fifth diode and a sixth diode connected between the first antenna terminal and the second antenna terminal, as well as a seventh diode and an eighth diode; a cathode terminal of the fifth diode and a cathode terminal of the sixth diode being connected to each other and to the input terminal of a first discharge path; and a cathode terminal of the seventh diode and a cathode terminal of the eighth diode being connected to each other and to the input terminal of a second discharge path.

4. The rectifier and limiter circuit having a plurality of time constants according to claim 1, characterized in that the second rectifier branch is a third N-type MOS transistor and a fourth N-type MOS transistor connected between the first antenna terminal and the second antenna terminal, the gate and drain of the third N-type MOS transistor being respectively connected to a first antenna terminal, the gate and drain of the fourth N-type MOS transistor being respectively connected to a second antenna terminal, and the source of the third N-type MOS transistor being connected to the source of the fourth N-type MOS transistor and to the input terminals of the two discharge paths.

5. The rectifier and limiter circuit having a plurality of time constants according to claim 1, characterized in that the second rectifier branch is a third N-type MOS transistor and a fourth N-type MOS transistor connected between the first antenna terminal and the second antenna terminal, as well as a tenth N-type MOS transistor and an eleventh N-type MOS transistor, the gate and drain of the third N-type MOS transistor being respectively connected to a first antenna terminal, the gate and drain of the fourth N-type MOS transistor being respectively connected to a second antenna terminal, and the source of the third N-type MOS transistor being connected to the source of the fourth N-type MOS transistor and to the input terminal of a first discharge path; and the gate and drain of the tenth N-type MOS transistor being respectively connected to a first antenna terminal, the gate and drain of the eleventh N-type MOS transistor being respectively connected to a second antenna terminal, and the source of the tenth N-type MOS transistor being connected to the source of the eleventh N-type MOS transistor and connected to the input terminal of a second discharge path.

6. The rectifier and limiter circuit having a plurality of time constants according to claim 1, characterized in that the two discharge paths are a first N-type MOS transistor and a second N-type MOS transistor connected in parallel, the drains of the first N-type MOS transistor and the second N-type MOS transistor being connected to the output terminal of the rectifier circuit, the gate of the first N-type MOS transistor being connected to the output terminal of a first control circuit and the source thereof being grounded, and the gate of the second N-type MOS transistor being connected to the output terminal of a second control circuit and the source thereof being grounded.

7. The rectifier and limiter circuit having a plurality of time constants according to claim 1, characterized in that the first control circuit comprises a second current mirror transistor, a first resistor, a second resistor, a fifth N-type MOS transistor, a sixth N-type MOS transistor and a first P-type MOS transistor; the source of the second current mirror transistor is connected to a power supply terminal, the drain thereof is grounded by the first resistor and the second resistor connected in series, and the gate thereof is connected to a bias voltage terminal; the source of the fifth N-type MOS transistor is connected to the drain terminal of the second current mirror transistor, the drain thereof is connected to the output terminal of the first control circuit, and the gate thereof is connected to a control signal terminal; the source of the first P-type MOS transistor is connected to the drain terminal of the second current mirror transistor, the drain thereof is connected to the output terminal of the first control circuit, and the gate thereof is connected to the gate of the sixth N-type MOS transistor, and the drain of the sixth N-type MOS transistor is connected to the output terminal of the first control circuit, the source thereof is grounded, and the gate of the first P-type MOS transistor and the gate of the sixth N-type MOS transistor are connected to a control signal terminal opposite to the control signal of the gate terminal of the fifth N-type MOS transistor.

8. The rectifier and limiter circuit having a plurality of time constants according to claim 1, characterized in that the second control circuit comprises a third current mirror transistor, a third resistor, a fourth resistor, a logic series switch unit, a first capacitor, a second capacitor and a seventh N-type MOS transistor; the source of the third current mirror transistor is connected to the power supply terminal, the drain thereof is grounded by the third resistor and the fourth resistor connected in series, and the gate thereof is connected to the bias voltage terminal; the input terminal of the logic series switch unit is connected to the drain terminal of the third current mirror transistor, and the output terminal thereof is connected to the output terminal of the second control circuit; the first capacitor is connected to the second capacitor in parallel, the positive poles of the first capacitor and the second capacitor are connected to each other and to the output terminal of the logic series switch unit, and the negative poles thereof are connected to each other and grounded; and the source terminal of the seventh N-type MOS transistor is grounded, the gate thereof is connected to the control signal terminal, and the drain thereof is connected to the output terminal of the second control circuit.

9. The rectifier and limiter circuit having a plurality of time constants according to claim 8, characterized in that the logic series switch unit is at least one logic switch in which the source terminal of the eighth N-type MOS transistor is connected to the source terminal of the second P-type MOS transistor and to the drain terminal of the third current mirror transistor to serve as the input terminal of the logic series switch unit, the drain terminal of the eighth N-type MOS transistor is connected to the drain terminal of the second P-type MOS transistor to serve as the output terminal of the logic series switch unit, the gate terminal of the eighth N-type MOS transistor is connected to the control signal terminal, and the gate terminal of the second P-type MOS transistor is connected to the control signal terminal opposite to the control signal of the gate terminal of the eighth N-type MOS transistor.

10. The rectifier and limiter circuit having a plurality of time constants according to claim 1, characterized in that the first control circuit is connected to a power supply terminal by a second current mirror transistor, the second control circuit is connected to the power supply terminal by a third current mirror transistor, and the gates of the second current mirror transistor and the third current mirror transistor are respectively connected to the gate terminal of a first current mirror transistor; and the source of the first current mirror transistor is connected to the power supply terminal and the drain thereof is grounded by a threshold unit.

11. The rectifier and limiter circuit having a plurality of time constants according to claim 10, characterized in that the threshold unit is at least one diode connected in series, or at least one P-type MOS transistor connected in series, or at least one N-type MOS transistor connected in series; among the at least one diode, the cathode terminal of any diode is connected to the anode terminal of an adjacent diode to form a serial structure, the anode terminal of a first diode is connected to the drain terminal of the first current mirror transistor to serve as the input terminal of the threshold unit, and the cathode terminal of the last diode is grounded to serve as the output terminal of the threshold unit; among the at least one P-type MOS transistor, the drain terminal of any P-type MOS transistor is connected to the source terminal of an adjacent P-type MOS transistor to form a serial structure, the source of the first P-type MOS transistor is connected to the drain terminal of the first current mirror transistor to serve as the input terminal of the threshold unit, the drain of the last P-type MOS transistor is grounded to serve as the output terminal of the threshold unit, and the gate of each P-type MOS transistor is connected to the drain thereof and among the at least one N-type MOS transistor, the source terminal of any N-type MOS transistor is connected to the drain terminal of an adjacent N-type MOS transistor to form a serial structure, the drain of the first N-type MOS transistor is connected to the drain terminal of the first current mirror transistor to serve as the input terminal of the threshold unit, the source of the last N-type MOS transistor is grounded to serve as the output terminal of the threshold unit, and the gate of each N-type MOS transistor is connected to the drain thereof.

12. A passive radio frequency tag, comprising the rectifier and limiter circuit having a plurality of time constants according to claim 1.

* * * * *